United States Patent
Strasser et al.

(10) Patent No.: US 10,780,378 B2
(45) Date of Patent: Sep. 22, 2020

(54) PROCESS FOR FILTRATION OF FLUIDS AND FILTER APPARATUS FOR PERFORMING THE PROCESS

(75) Inventors: Stefan Strasser, Strasse im Attergau (AT); Roman Grösswang, Timelkam (AT); Johannes Kneissl, Weyregg (AT); Georg Eisl, Salzburg (AT); Klaus Brandt, Zipf (AT)

(73) Assignee: Lenzing Aktiengesellschaft, Lenzing (AT)

( * ) Notice: Subject to any disclaimer, the term of this patent is extended or adjusted under 35 U.S.C. 154(b) by 1253 days.

(21) Appl. No.: 13/634,085

(22) PCT Filed: Mar. 10, 2011

(86) PCT No.: PCT/AT2011/000119
§ 371 (c)(1),
(2), (4) Date: Mar. 25, 2013

(87) PCT Pub. No.: WO2011/109847
PCT Pub. Date: Sep. 15, 2011

(65) Prior Publication Data
US 2013/0168330 A1 Jul. 4, 2013

(30) Foreign Application Priority Data
Mar. 12, 2010 (AT) ...................................... 156/2010

(51) Int. Cl.
*B01D 29/66* (2006.01)
*B01D 29/68* (2006.01)
(Continued)

(52) U.S. Cl.
CPC ............ *B01D 29/66* (2013.01); *B01D 29/68* (2013.01); *B01D 37/02* (2013.01); *B01D 37/043* (2013.01); *B01D 37/046* (2013.01)

(58) Field of Classification Search
None
See application file for complete search history.

(56) References Cited

U.S. PATENT DOCUMENTS 3,393,262 A * 7/1968 Durso ................... G21C 11/06
264/188
3,574,509 A 4/1971 Zentis et al.
(Continued)

FOREIGN PATENT DOCUMENTS

DE 3430523 A1 2/1986
EP 0056656 A1 7/1982
(Continued)

*Primary Examiner* — Robert J Popovics
(74) *Attorney, Agent, or Firm* — Venable LLP

(57) ABSTRACT

The invention relates to a process for filtration of fluids, especially of aqueous media, by means of a backflush filter apparatus consisting of a cylindrical housing, a cylindrical and perforated support body installed coaxially therein, a filter material, a support fabric, and a mobile backflush device present therein, said process enabling improved removal of fine and ultrafine particles, and of particles with greasy or compressible consistency, and allowing higher solid concentrations. The process according to the invention has the steps below. a) Formation of a filtercake in the perforation of the support body; b) deposition of the relatively fine particles or of the particles with greasy or compressible consistency on or in the filtercake; c) backflushing after attainment of the predefined filter loading or of the maximum permissible pressure differential, or when the filtrate volume flow goes below a minimum. A further aspect of the invention is a filter apparatus for performance of the process, characterized in that the filter material consists of a filter fabric with an air permeability of 700-1300 l/m²s at pressure differential 200 Pa.

20 Claims, 4 Drawing Sheets

(51) Int. Cl.
*B01D 37/02* (2006.01)
*B01D 37/04* (2006.01)

(56) References Cited

U.S. PATENT DOCUMENTS

| | | | | |
|---|---|---|---|---|
| 3,831,746 | A * | 8/1974 | Wilson | B04C 5/00 209/2 |
| 4,358,370 | A * | 11/1982 | Jameson | B01D 29/15 210/415 |
| 4,415,448 | A | 11/1983 | Lennartz et al. | |
| 4,612,117 | A | 9/1986 | Neumann | |
| 4,643,828 | A * | 2/1987 | Barzuza | B01D 29/23 210/411 |
| 4,795,560 | A * | 1/1989 | Chupka | B01D 29/111 210/497.01 |
| 4,885,090 | A * | 12/1989 | Chupka | B01D 29/111 210/497.01 |
| 4,906,373 | A | 3/1990 | Drori | |
| 5,330,642 | A * | 7/1994 | Klein | B01D 37/00 210/194 |
| 5,407,563 | A * | 4/1995 | Blake | B01D 33/067 210/155 |
| 5,453,194 | A * | 9/1995 | Klein | B01D 29/05 210/411 |
| 5,566,611 | A * | 10/1996 | Scheucher | B30B 9/121 100/127 |
| 5,795,488 | A * | 8/1998 | Kalt | B01D 29/668 210/767 |
| 6,332,977 | B1 * | 12/2001 | Janecek | B01D 29/39 210/149 |
| 8,496,117 | B2 * | 7/2013 | Leath | B01D 33/11 210/373 |
| 9,561,454 | B2 * | 2/2017 | Browning | B01D 29/035 |
| 9,566,541 | B2 * | 2/2017 | Konig | B01D 29/62 |
| 10,245,531 | B2 * | 4/2019 | Steiner | B01D 29/23 |
| 10,543,987 | B2 * | 1/2020 | Gundlach | B65G 15/30 |
| 2006/0043014 | A1 | 3/2006 | Takatsuka | |
| 2013/0168330 | A1 * | 7/2013 | Strasser | B01D 29/68 210/771 |
| 2018/0178147 | A1 * | 6/2018 | Thysell | B01D 25/215 |

FOREIGN PATENT DOCUMENTS

| | | |
|---|---|---|
| EP | 0058656 A1 | 8/1982 |
| EP | 0347477 A1 | 12/1989 |
| GB | 524385 A | 8/1940 |
| JP | 60175516 S | 9/1985 |
| JP | 2000032974 A | 2/2000 |
| JP | 2002517314 A | 6/2002 |
| JP | 2002316198 A | 10/2002 |
| JP | 2003340214 A | 12/2003 |
| JP | 2004160319 A | 6/2004 |
| JP | 2005246246 A | 9/2005 |
| JP | 2010042336 A | 2/2010 |
| WO | 99/64664 A1 | 12/1999 |

* cited by examiner

PROCESS FOR FILTRATION OF FLUIDS AND FILTER APPARATUS FOR PERFORMING THE PROCESS

BACKGROUND OF THE INVENTION

1. Field of the Invention

The invention relates to a process for the filtration of fluids, especially of aqueous media, and to a filter apparatus for performing the process.

2. Description of Related Art

Generally, there exist four conceptual models for the filtration procedure. We distinguish between cake, blockage, depth, and cross-flow filtration. Backwash filter apparatuses mostly use blockage filtration which is also referred to as sieve filtration. Blockage filtration describes the process where the solid particles clog up the pores of the filter medium, unlike cake filtration where the solid particles are deposited on the surface and form a filter cake of increasing thickness.

There exist several backwash filter designs that, while conforming to the current state of the art, are less suited for the formation of cakes and high solids contents. The suction nozzle backwash filter system, as described in U.S. 20060043014, provides a large distance from the suction nozzle to the filter fabric, which leads to bypass flows. These so-called bypass flows flow directly from the unfiltrate chamber into the backwash extraction device and cause backwash liquid losses that are not involved in the cleaning of the filter fabric. This design-related characteristic, however, is necessary to allow large particles that may be present in the medium to get into the suction nozzle. As a result, the distance between the suction nozzle and the filter fabric must be greater than or equal to the diameter of the largest particle. If these particles were not discharged, they would accumulate in the unfiltrate chamber and eventually cause blocking of the filter. If one allowed the formation of a cake in this system, because of the greater demand for backwash liquid, more washing liquid would be needed than there exists available filtrate. This causes blocking of the filter, and proper filter function is no longer ensured.

Another backwash filter apparatus is the cartridge-type flush-back filter described in U.S. Pat. No. 4,415,448. In this filter system, the least favorable position of a particle in the filter element prior to backwashing is at the side of the filter element facing the extraction device. During backwashing, it travels along the entire length of the filter cartridge before exiting the filter cartridge and being able to enter the extraction device for the backwash liquid. Only then can the extraction device rotate to the next element.

During the time necessary therefor, backwash liquid is drained through the entire filter cartridge, thus also in the area of the most favorable particle which, at the beginning of backwashing, is located at the inflow end of the filter cartridge.

As a result, in a complete cleaning process of the filter cartridges, large quantities of backwash liquid are required to completely remove all particles. In practice, often only a part of the cartridges is cleaned. The major part of them remains contaminated. Thus, in such filter systems, in the presence of such larger quantities of solids as are present in cake-forming filtration, the ratio of backwash liquid to filtrate produced becomes so unfavorable that in most cases more filtrate than is available would be required. Thus, the proper function of the filter is no longer ensured.

In the filter apparatus according to EP 0058656 A1 to Lenzing AG, sealing of the unfiltrate chamber 6 toward the reject chamber 4 is accomplished by a pressed-on sliding member 3 (FIG. 1). This way, bypass flows can be prevented. During backwashing, the entire flow of the washing liquid passes through the filter material 1 counter to the filtration direction and thus contributes toward cleaning the filter material. The longest distance a particle must travel until being transported out of the system is only approx. 5 mm, which corresponds to the wall thickness of the perforated support body 2. Subsequently, the particle will already be in the reject chamber 4, This way, substantially less backwash medium is needed than in comparable systems. This filter system embodied according to EP 0058656 A1 to Lenzing AG is suited for the depth filtration of viscous media and is preferably fitted with nonwovens of stainless steel fibers and used in the field of the filtration of spinning solutions. The described embodiment is not suited for the filtration of low-viscosity aqueous media in the presence of difficult-to-filter particles.

DETAILED DESCRIPTION OF THE INVENTION

Based on a filtration process that can be performed with this backwash filter apparatus, consisting essentially of a cylindrical housing, a cylindrical and perforated support body installed coaxially therein, a filter material, a support fabric, as well as a movable backwash device disposed therein, it is the object of the present invention to provide a process for the filtration of fluids, especially of aqueous media, which process permits the improved separation of fine and ultrafine particles as well as of particles of a greasy or compressible consistency and higher solid concentrations.

The process according to the invention includes the following steps:

a) formation of a filter cake in the perforation of the support body;

b) separation of the finer particles and the particles of a greasy or compressible consistency, respectively, at or in the filter cake;

c) backwashing after attainment of the predefined filter load or the maximum permissible pressure differential, or when the filtrate volume flow drops below a minimum.

Another object is to provide a filter apparatus for performing the process according to the invention.

The filter apparatus according to the invention, consisting of a cylindrical housing, a cylindrical and perforated support body installed coaxially therein, a filter material, a support fabric as well as a movable backwash device disposed therein, is characterized in that the filter material consist of a filter fabric having an air permeability of 700-1300 $l/m^2s$ at a pressure differential of 200 Pa.

These filter materials permit very high filtrate flows with very little resistance and the very fast formation of a filter cake.

The filter material is clamped in place between the perforated support body and the support fabric, the filter material resting against the perforated support body with its entire surface and being clamped onto the support body by means of a clamping device (not shown).

Figure 5A:
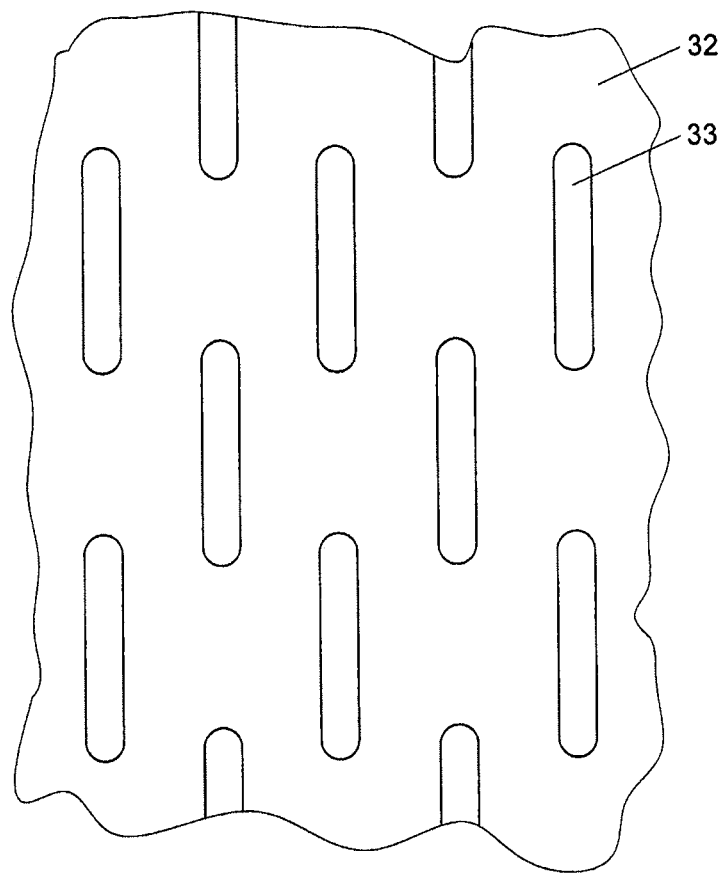
FIGS. 5a and FIG. 5b depict suitable exemplary filter materials in accordance with the present invention.
Figure 5B:
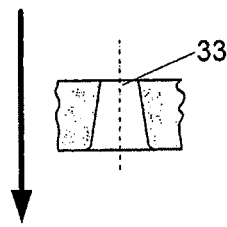

Another suitable filter material is shown in FIGS. 5a and 5b. It consists of an ultrafine perforated metal sheet 32 having slot-shaped openings 33, the openings widening and being rounded toward the filtrate chamber as shown in the cross-sectional view (FIG. 5b). The slot width is 5-80 micrometers, preferably 10-20 micrometers. The free filter area is 5-20%, preferably 5-10%, related to the total area of the filter material. The filtration direction is indicated in FIG. 5b by an arrow. Such filter material also permits the very rapid formation of a filter cake and leads to improved backwashability.

The filter cake is—after its formation—disposed in the perforations of the support body and does not, as a result thereof, interfere with the backwash unit.

Sealing accomplished by the pressed-on sliding member prevents the direct flow of unfiltrate into the reject chamber.

The invention is described in further detail by means of the following description and FIGS. 1 to 4.

Figure 1:
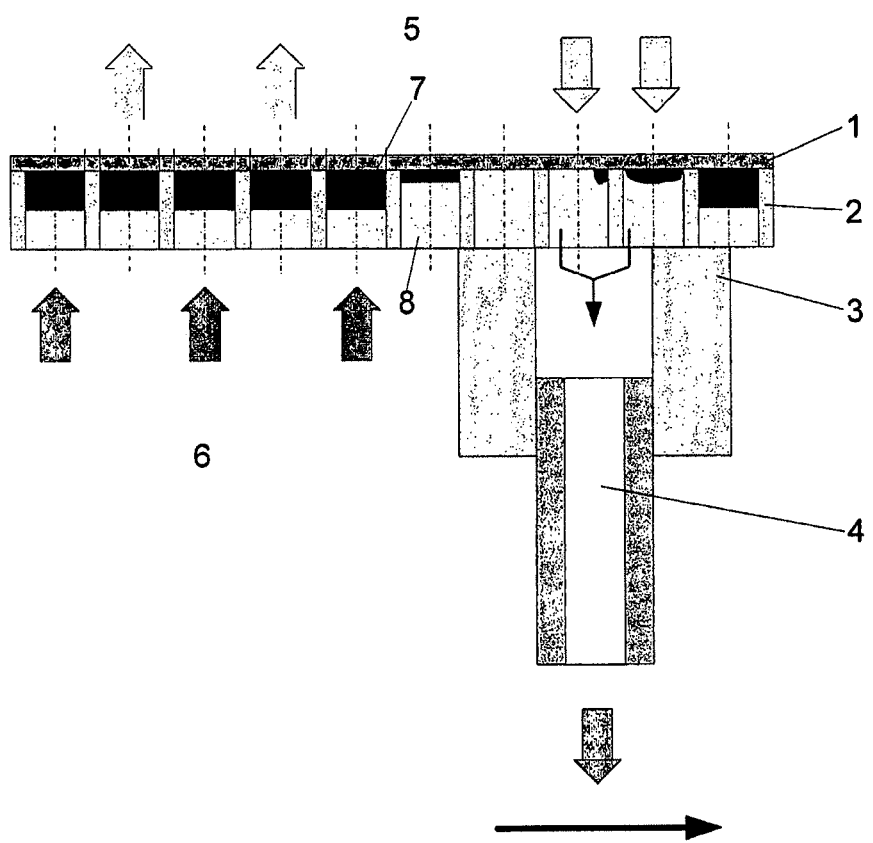
FIG. 1 depicts a exemplary filtration system in accordance with the present invention.

FIG. 1 is a cross-sectional view of the structure of the essential filter components. A filter material 1 is disposed between a perforated support body 2 and a support fabric (not shown). The left-hand portion of FIG. 1 shows the filter cake 7 formed in the perforations 8. The filtration takes place from the unfiltrate chamber 6 toward the filtrate chamber 5, as implied by arrows. In the right-hand portion of FIG. 1, backwashing is implied. The backwash device 3+4 is moved in the direction of the horizontal arrow.

The way cake formation works at the inventive filter can be explained as follows with reference to FIG. 1. At the beginning, the unfiltrate loaded with solids is urged from the unfiltrate chamber 6 through the filter material 1 and into the filtrate chamber 5. The coarse particles are deposited on the filter material 1 and form a support layer for the finer particles. With the help of this support layer, it is now possible to also separate particles whose grain size is far smaller than the pore size of the filter material. A filter cake 7 of increasing thickness accumulates in the bores 8, until the maximum permissible pressure differential between unfiltrate chamber 6 and filtrate chamber 5 is attained or a filtrate volume flow drops below a minimum. Following the completed formation of a cake, it can now be backwashed very easily, and in a few seconds, with the backwash device, thus cleaning the filter surface. A backwash device is known, for example, from EP 0056656 (Lenzing AG).

Figure 2:
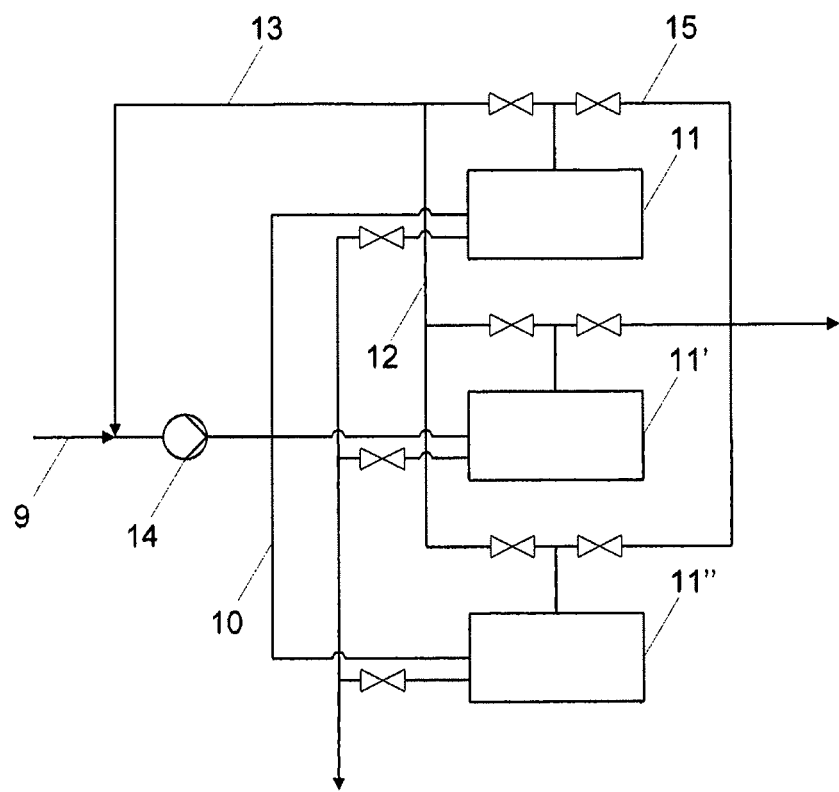
FIG. 2 is a flow circuit diagram for an exemplary process in accordance with the present invention.

FIG. 2 shows a process flow circuit diagram. If the unfiltrate contains only few coarse particles, the effective support layer used to filter out the fine particles will be formed slowly, with a penetration of the fine particles taking place at the beginning, forming the so-called initial filtrate or turbidity spike. However, in order to achieve a filtrate quality having a constantly low solids concentration, filtering will be continued in a circuit until the necessary support layer has been formed and clean filtrate can be produced. The required support layer will have been formed as soon as no fine particles penetrate the filter material.

For this procedure, one or several filter apparatuses 11, 11',11" are now supplied with unfiltrate from the unfiltrate conduit 9. If the process requires several filter apparatuses, they are supplied via a distributor conduit 10.

When a single filter apparatus is used, the filtrate, which at the beginning is still turbid, is returned to a location directly upstream of the pump 14 via the return conduit 13 (circulation). When several filter apparatuses are used, the still turbid filtrate enters a collecting conduit 12 and is then returned along the same path via the return conduit 13 to upstream of the pump 14. If the desired filtrate quality has now been reached due to the formed support layer, the return conduit of the respective filter is closed, and the filtrate conduit 15 is unblocked.

If the solids in the unfiltrate, due to their greasy or compressible consistency, are difficult to filter or cannot be filtered at all with the filter material used, and if said solids would therefore, within a very short period of time, cause blockage of the filter material, then filter aids can be added in order to influence the filtration characteristics.

Figure 3:
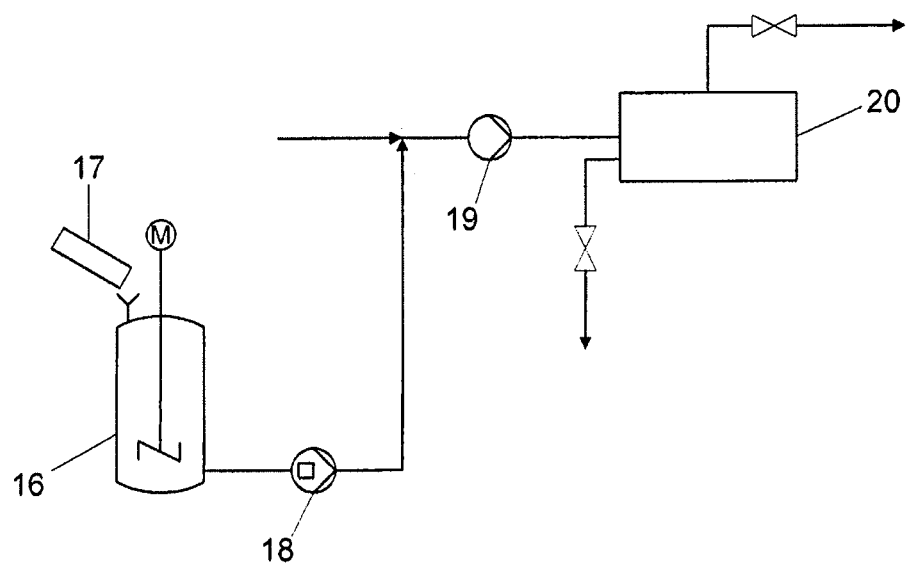
FIG. 3 is a flow circuit diagram for an exemplary process in accordance with the present invention.

FIG. 3 shows a process flow diagram for a process configuration including the addition of filter aids.

For this purpose, filter aid slurry is prepared in a slurry container 16. The slurry is prepared by mixing of filtrate and filter aid 17. In most cases, the filter aid is of powder form and must therefore be stirred into the filtrate. For the filtration at the filter apparatus, the slurry is fed by means of a positive displacement pump 18 to upstream of the unfiltrate pump 19 in the inlet to the filter 20. Dosing of the filter aid slurry is carried out directly after the end of backwashing in the filter. Due to the high flow velocities in the filter, the support layer is formed very rapidly. The subsequently inflowing solids from the unfiltrate can now be retained by the support layer, deposit on the support layer, and form a filter cake.

From economic and ecologic perspectives, it makes sense to recover the filter aid as far as this is possible.

Suitable filter aids are fine sand, metal powder, and other types of fine-grained heavy powder with a grain spectrum from 30 micrometers to 200 micrometers and a density of $1{,}500$ kg/m$^3$ to $10{,}000$ kg/m$^3$, preferably from $2{,}000$ kg/m$^3$ to $8{,}000$ kg/m$^3$, that need to be added or are already naturally present in the unfiltrate, for example, in sand-containing river water.

Figure 4:
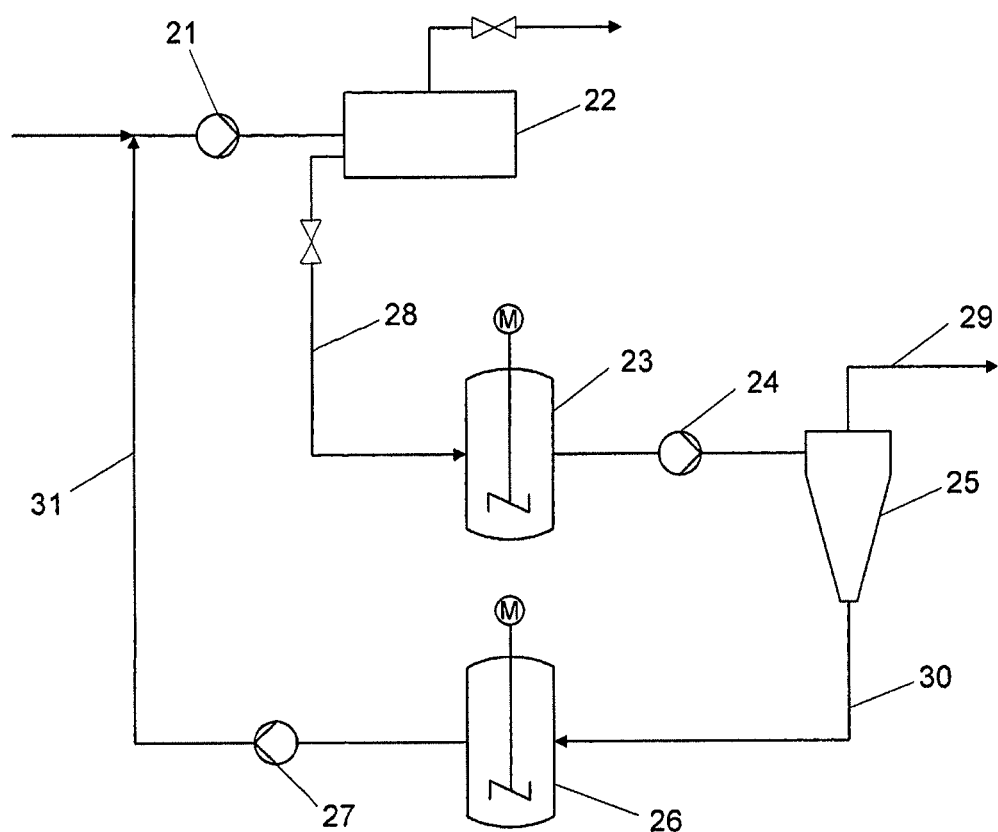
FIG. 4 is a flow circuit diagram for an exemplary process in accordance with the present invention.

FIG. 4 shows a process flow diagram for a process configuration with filter aid recovery.

For recovery, the cyclically produced backwash liquid (reject) from the inventive filter apparatus is fed into a collection tank 23 via the reject conduit 28. The existing reject consists of medium to be filtered, solids to be filtered out, and filter aid. From the collection tank, the reject is then fed to a separator apparatus 25 by means of a pump 24, and the solids to be filtered out are separated from the filter aid by density separation. The solids to be filtered out are extracted in the upper conduit 29, and the filter aid is extracted as concentrated slurry in the lower conduit 30. The separation can be enhanced by centrifugal force such as in a hydrocyclone. Subsequently, the recovered filter aid is stored in the slurry collection tank 26. Then, the filter aid will be fed as necessary by means of the pump 27 upstream of the filter pump 21.

In the process configuration with added filter aid, said filter aid is fed into the filter aid recovery section at the beginning of the filtration process, e.g., in the collection tank 23. In the course of the filtration, lost filter aid will be compensated for by adding the necessary quantities.

When using the filter apparatus according to the invention, this process is particularly effective because, due to the low regeneration time of a few seconds and due to the low thickness of the precoat of only a few tenths of a millimeter, the consumption of filter aid is very low and it is possible to work with very high filtration speed. The term 'filtration speed' denotes the volume flow per filter area.

In the above-mentioned prior art filter systems, precoat layers must have a thickness of at least a few millimeters in order to ensure that the existing layer is uniform throughout. In most cases, the regeneration of these systems takes several minutes.

In connection with this invention, backwashing also includes the discharge of the solids by means of gases.

In another embodiment of the invention, following the completion of a filtration cycle, the remaining fluid is pushed out of the unfiltrate chamber, the filtrate chamber, and the reject chamber by means of process gas, and subsequently, the solids are dried and discharged pneumatically using the same gas.

What is claimed is:

1. A process for filtration of a fluid stream including particles comprising the steps of:
    providing a filtration apparatus which comprises:
        a cylindrical housing having an inlet and an outlet;
        a cylindrical support body having perforations and being installed coaxially in the cylindrical housing;
        a filter material selected from the group consisting of filter fabric having an air permeability of 700-1300l/m$^2$s at a pressure differential of 200 Pa and a perforated metal sheet having slot openings, wherein the slot width is 5 to 80 micrometers; and
        a movable backwash device, a portion of which sealingly engages an interior surface of said cylindrical housing, disposed within said cylindrical housing;
    flowing said fluid stream including particles into said housing inlet to an interior of said cylindrical support body;
    forming a support layer of particles on the filter material;
    forming a filter cake in the perforations of the support body as inflowing particles from the fluid stream are retained on the support layer; and
    backwashing the filter material after attainment of a predefined filter load or a maximum permissible pressure differential, or when a filtrate volume flow drops below a minimum.

2. The process according to claim 1, further comprising adding a filter aid prior to or during the flowing of said fluid stream.

3. The process according to claim 1 or 2, wherein dense particles with a grain spectrum from 30-200 micrometers are separated from a backwashing reject by means of a density separating process, and are returned to fluids upstream of the backwash filter apparatus.

4. The process according to claim 3, further comprising adding dense particles to the fluid stream prior to or during the flowing, separating the dense particles from the reject by means of a density separating process, and returning the dense particles upstream of the backwash filter apparatus.

5. The process according to claim 4, wherein the dense particles are fine sand, metal powder, or other fine-grained dense powder with a grain spectrum from 30 micrometers to 200 micrometers and a density from 1,500 kg/m$^3$ to 10,000 kg/m$^3$.

6. The process according to claim 5, wherein the density is from 2,000 kg/m$^3$ to 8,000 kg/m$^3$.

7. The process according to claim 4, wherein the density separating process includes a hydrocyclone.

8. The process according to claim 1, wherein after completion of the flowing, forming and backwashing steps, the process further comprises pushing out remaining fluid from an unfiltrate chamber, filtrate chamber, and reject chamber by means of a gas and wherein subsequently any solids are dried and pneumatically discharged by means of the gas.

9. The process according to claim 1, wherein said fluid is an aqueous media.

10. The process according to claim 1, wherein the fluids are circulated in a circuit.

11. The process according to claim 1, wherein the perforations of the support body comprise tapered holes.

12. The process according to claim 1, wherein the filter material is said perforated metal sheet.

13. The process according to claim 1, wherein the filter material is said filter fabric and wherein said filter fabric is disposed between said cylindrical support body and a support fabric.

14. A filter apparatus comprising a cylindrical housing having an inlet and an outlet; a cylindrical support body having perforations being installed coaxially in the cylindrical housing; a filter material selected from the group consisting of a filter fabric having an air permeability of 700-1300l/m$^2$s at a pressure differential of 200 Pa, and a perforated metal sheet having slot openings, wherein the slot width is 5 to 80 micrometers; and a movable backwash device disposed within said cylindrical housing, wherein said filter material provides for the forming of a support layer of particles on the filter material when a fluid stream comprising particles is filtered in said filter apparatus, wherein said support layer provides for the forming of a filter cake in the perforations of the support body, wherein the filter cake forms on said support layer, and wherein said backwash device is for backwashing the filter material after attainment of a predefined filter load or a maximum permissible pressure differential, or when a filtrate volume flow drops below a minimum.

15. The filter apparatus according to claim 14, wherein the filter cake formed in the perforations of the support body does not interfere with the backwash device.

16. The filter apparatus according to claim 14, wherein a sealing prevents a direct flow of the fluid stream into a reject chamber of the apparatus.

17. The filter apparatus according to claim 14, wherein a clamping device is provided for an even clamping of the filter material onto the support body.

18. The filter apparatus according to claim 14, wherein the perforations of the support body comprise tapered holes.

19. The filter apparatus according to claim 14, wherein the filter material is said perforated metal sheet.

20. The filter apparatus according to claim 14, wherein the filter material is said filter fabric and wherein said filter fabric is disposed between said cylindrical support body and a support fabric.

* * * * *